United States Patent [19]

Schmidt

[11] 4,212,202
[45] Jul. 15, 1980

[54] DISTRIBUTED COMPENSATION FOR CAPACITANCE-TYPE FLUID MEASURING APPARATUS

[75] Inventor: Charles C. Schmidt, Bettendorf, Iowa

[73] Assignee: The Bendix Corporation, Southfield, Mich.

[21] Appl. No.: 64,946

[22] Filed: Aug. 9, 1979

Related U.S. Application Data

[63] Continuation-in-part of Ser. No. 944,114, Sep. 20, 1978, abandoned.

[51] Int. Cl.$^2$ ............................................. G01F 23/26
[52] U.S. Cl. ................................... 73/304 C; 361/284
[58] Field of Search ...................... 73/304 C; 361/284; 29/252, 41

[56] References Cited

U.S. PATENT DOCUMENTS

| | | | |
|---|---|---|---|
| 2,700,901 | 2/1955 | Rickner | 361/284 |
| 2,981,105 | 4/1961 | Ryder | 73/304 C |
| 3,022,665 | 2/1962 | Smith | 73/304 C |
| 3,295,372 | 1/1967 | Gronner | 73/304 C |
| 3,596,517 | 8/1971 | Ryder | 73/304 C |
| 3,827,300 | 8/1974 | Thaler | 73/304 C |
| 4,021,707 | 5/1977 | Ehret et al. | 361/284 |

*Primary Examiner*—Donald O. Woodiel
*Attorney, Agent, or Firm*—W. G. Christoforo; Bruce L. Lamb

[57] ABSTRACT

A capacitance-type fluid gage has the probe electrode shaped in accordance with a specified function of container volume and the relative dielectric of the fluid to be gaged.

10 Claims, 9 Drawing Figures

FIG. 4

COLUMN NUMBER

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| $V_f$ (ft³) | h (ft) | V | f(V) | $\Delta$h(ft) | $\Delta$f(V) | $d_1$(in) | Fuel (lbs) | $\Delta Ce$(pF) | $\Delta Ce$/lb | Fuel(lbs) | $\Delta Ce$(pF) | $\Delta Ce$/lb | Error (pF) | Error (%Full Scale) |
| 0 | 0 | 0 | 0 | | | | 0 | 0 | | 0 | 0 | | 0 | 0 |
| .5 | .1 | .1 | .07516 | .1 | .07516 | .479 | 24.46 | 1.052 | .04303 | 26.89 | 1.197 | .04452 | .040 | .344 |
| 1 | .2 | .2 | .1546 | .1 | .07944 | .498 | 48.91 | 2.105 | .04303 | 53.79 | 2.386 | .04436 | .071 | .617 |
| 1.5 | .3 | .3 | .2386 | .1 | .08400 | .518 | 73.37 | 3.156 | .04302 | 80.68 | 3.564 | .04418 | .092 | .797 |
| 2 | .4 | .4 | .3278 | .1 | .0892 | .538 | 97.82 | 4.210 | .04303 | 107.57 | 4.736 | .04403 | .107 | .926 |
| 2.5 | .5 | .5 | .4224 | .1 | .0946 | .557 | 122.28 | 5.261 | .04303 | 134.46 | 5.897 | .04386 | .111 | .960 |
| 3 | .6 | .6 | .5232 | .1 | .1008 | .578 | 146.73 | 6.315 | .04304 | 161.36 | 7.051 | .04370 | .108 | .930 |
| 3.5 | .7 | .7 | .6305 | .1 | .1073 | .597 | 171.19 | 7.366 | .04303 | 188.25 | 8.195 | .04353 | .095 | .817 |
| 4 | .8 | .8 | .7453 | .1 | .1148 | .618 | 195.64 | 8.420 | .04304 | 215.14 | 9.332 | .04338 | .075 | .644 |
| 4.5 | .9 | .9 | .8681 | .1 | .1228 | .637 | 220.10 | 9.472 | .04303 | 242.03 | 10.459 | .04321 | .044 | .384 |
| 5 | 1.0 | 1.0 | 1 | .1 | .1319 | .657 | 244.55 | 10.524 | .04303 | 268.92 | 11.579 | .04306 | .007 | .064 |
| | | | | | | | NOMINAL FUEL | | | END POINT FUEL | | | | |

DISTRIBUTED COMPENSATION FOR CAPACITANCE-TYPE FLUID MEASURING APPARATUS

This application is a continuation-in-part of Application Ser. No. 944,114 filed Sept. 20, 1978, now abandoned.

BACKGROUND OF THE INVENTION

This invention relates to capacitance-type fluid measuring apparatus or gages and more particularly to means for compensating for errors in such gages so as to provide for an indication of the mass of a fluid within a container or containers within a close degree of accuracy.

In the conventional rebalancing bridge-type of capacitance gage, a measuring capacitor having shaped electrodes is immersed in the fluid in a container. The change in capacitance due to a change in fluid level is used to provide an indication of the level of the fluid in the container or the mass of the fluid remaining in the container. This is accomplished by connecting the measuring capacitor across one arm of a bridge circuit and a reference capacitor across an opposing arm of the bridge circuit in which a pair of voltage sources comprise the other two arms of the bridge circuit. A phase sensitive detector responsive to the bridge output is coupled to a rebalancing motor to vary the voltage applied to the reference capacitor thereby maintaining the bridge balance.

When a gage of the above type is employed to measure the quantity of fluid in a tank such as the quantity of fuel in an aircraft fuel tank, the gage readout or indicator is calibrated in terms of mass or weight of the fuel remaining in the tank. It is standard procedure to shape or profile the electrodes of the measuring capacitor such that the dry capacitance of the immersed portion is at all times propertional to the corresponding volume of fluid in the tank. In that manner the gage will provide an accurate indication of weight of fuel so long as the capacity index $(k-1)/D$, where k and D are the relative dielectric constant and density of the fuel respectively, is a constant. Unfortunately, the capacity index is not a constant considering the types of fuels used and the temperature ranges to which they are subjected, so that some means is required to compensate for capacity index variation.

One means for providing compensation for the above-mentioned variation in capacity index is an auxiliary sensing capacitor immersed in the fluid to be gaged, usually close to the bottom of the fluid container, and a compensating circuit which cooperates with the auxiliary sensing capacitor. Compensating means of this type are described in the patent to Stanley J. Smith, U.S. Pat. No. 3,022,665 and in a more recent patent to Rudolph Ehert et al. U.S. Pat. No. 4,021,707. Because of temperature stratification of fuel in aircraft fuel tanks, whereby relatively cool fuel sinks to the bottom so that the auxiliary sensing capacitor does not see a truly representative sample of the fuel within the container, these compensation means are not fully satisfactory. Another method for providing compensation for capacity index variation is described in the patent to Alfred D. Gronner, U.S. Pat. No. 3,295,372. According to that method, compensation starts by approximating the relationship $(k-1)=(AD)^n$, where k and D are as described above, A is a proportionality constant and n is an exponent. According to the patent a capacitor of a predeterminable correct value is placed in series with the measuring capacitor so that this series combination can be profiled to a certain hyperbolic function of the capacity of the measuring condenser chosen. A constant amplitude alternating voltage is applied to the combination. Assuming a constant fuel dielectric constant the current flowing in the capacitor combination will be a linear function of the height of the fluid and the fluid container. If a linear readout is desired, a rebalance potentiometer is characterized with the same function.

SUMMARY OF THE INVENTION

According to the invention to be described below a distributed compensation scheme for a dielectric fluid, and more particularly aircraft fuel, quantity gaging system employs a mechanically contoured probe which has a special non-linear relationship to tank volume and a fixed series capacitor of the type mentioned above or the equivalent thereof.

It is thus an object of the invention to provide a simple means for compensating a capacitance fluid measuring apparatus.

It is another object of the invention to provide the above-mentioned means by contouring the probe capacitor electrodes in accordance with a special non-linear relationship relating to tank volume.

It is another object of the invention to combine in a mathematical function a fixed value with the value of the probe capacitance so that the value of the function is directly proportional to fluid mass.

A principal value of this invention is to provide the aforementioned compensating means in an aircraft fuel gage.

These and other objects of the invention will become clear with a reading and understanding of the following wherein:

FIG. 4 is a table of illustrative values calculated in the design of a device made according to the invention.

DESCRIPTION OF THE PREFERRED EMBODIMENT

Figure 1:
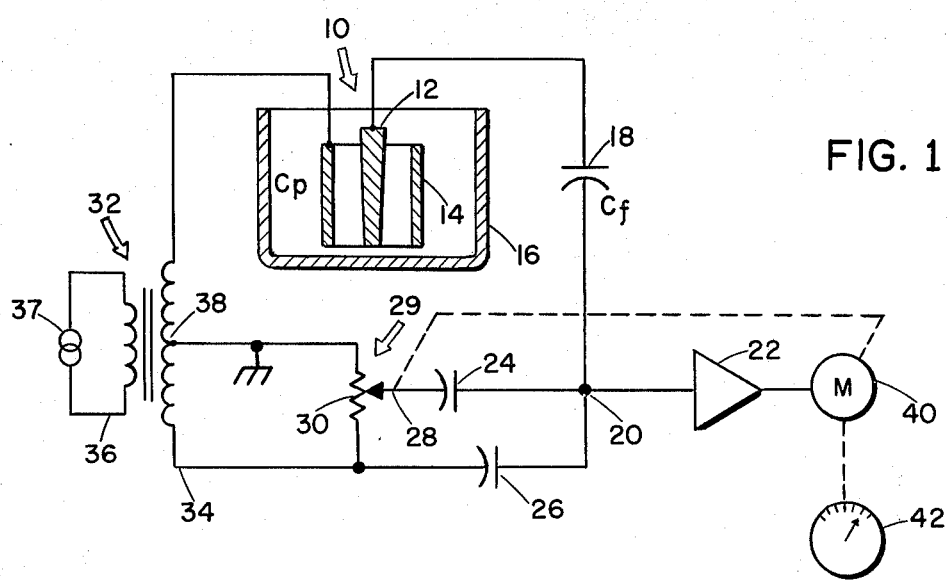
FIG. 1 is a schematic of a capacitance-type fluid measuring probe and its associated bridge circuit.

Refer first to FIG. 1 where a gage capacitance probe 10 is comprised of electrodes 12 and 14 immersed, for the purposes of this description, in a fuel tank 16. The capacitance $C_p$ of probe 10 varies with the fuel level in tank 16 as known to those skilled in the art. Electrode 12 is connected to one plate of fixed capacitor 18 whose other plate is connected to input terminal 20 of amplifier 22. Terminal 20 is also connected to one plate of a capacitor 24 whose other plate is connected to the slider 28 of rebalancing potentiometer 29. Input terminal 20 is also connected to one plate of capacitor 26 whose other plate is connected to one end of a secondary transformer winding 34 of transformer 32. The other end of winding 34 is connected to electrode 14 of probe 10. Potentiometer winding 30 is connected between the grounded center tap 38 of winding 34 and the common terminal of winding 34 and capacitor 26. A primary winding 36 of transformer 32 is connected to a source of alternating power 37, to energize the circuit. Amplifier 22 drives a standard two-phase motor 40 whose output shaft is mechanically connected to slider 28 and to a fuel mass indicator 42. As known, to those skilled in the art, at some initial condition, such as when tank 16 is full, there is no signal at terminal 20, motor 40 is unenergized and indicator 42 indicates the full tank condition. In response to a change in capacitance $C_p$ due to a lowering of the fuel level within tank 16, bridge unbalance is established so as to generate a signal at terminal 20 and thus energize motor 40 through amplifier 22 to drive slider 28 to rebalance the bridge. The repositioning of slider 28 also causes the repositioning of indicator 42, whereby a new fuel mass is indicated.

A compensation scheme for a capacitive fuel mass gaging system such as shown at FIG. 1 employs a mechanically contoured probe (to be described more fully below) that has a special non-linear relationship to tank volume and a fixed series capacitor 18. Hence, the equivalent capacitance $C_e$ that one sees by measuring the series combination of the probe and capacitor 18 is $$C_e = (C_f C_p)/(C_f + C_p) \tag{1}$$

where $C_f$ is the fixed capacitance of capacitor 18 and $C_p$ is the probe capacitance which is given by $$C_p = C_{po}[1 + f(V)(k-1)] \tag{2}$$

where $C_{po}$ is the capacitance of the probe when tank 16 is empty (assuming there is no parasitic capacitance), f(V) is the non-linear function of tank volume and k is the relative dielectric constant of the fuel. Here, V is fuel volume normalized by the total volume of the container and $$0 \leq f(V) \leq 1, \quad 0 \leq V \leq 1$$

$$f(V) = 0 \text{ for } V = 0$$

$$f(V) = 1 \text{ for } V = 1 \tag{3}$$

The change in capacitance, $\Delta C_e$, due to variation in the mass of fuel in tank 16 is given by:

$$\Delta C_e = \frac{C_f C_{po}[1 + f(V)(k-1)]}{C_f + C_{po}[1 + f(V)(k-1)]} - \frac{C_f C_{po}}{C_f + C_{po}} \tag{4}$$

After some algebraic manipulation, this reduces to $$\Delta C_e = \frac{C_f^2 C_{po}}{C_f + C_{po}} \times \frac{f(V)(k-1)}{C_f + C_{po} + C_{po} f(V)(k-1)} \tag{5}$$

Setting $$C_f^2 C_{po}/(C_f + C_{po}) = A$$

$$(C_f + C_{po}) = \alpha$$

and $$C_{po} = \beta$$

equation (5) becomes:

$$\Delta C_e = \frac{A f(V)(k-1)}{\alpha + \beta f(V)(k-1)} \tag{6}$$

As known to those skilled in the art, fuel mass M is related to fuel dielectric (assuming constant K) according to the following:

$$M = \frac{V(k-1)}{a + b(k-1)} \tag{7}$$

To find the accuracy with which $\Delta C_e$ can represent M, let A=1 for proper scaling. In practice, this is accomplished by adjusting the gain of the indicator. Also, choose capacitance values $C_f$ and $C_{po}$ such that $\alpha = a$, $\beta = b$. Then the following expression for full scale error can be written:

$$\text{error} = \frac{\Delta C_e - M}{M_{max.}}$$

$$= \frac{f(V)}{V_{max.}} \cdot \frac{a + b(k-1)}{a + bf(V)(k-1)} - \frac{V}{V_{max.}} \tag{8}$$

Setting error=0, substituting $V_{max} = 1$ and solving for f(V) results in the following:

$$f(V) = \frac{aV}{a + b(k-1)(1-V)} \tag{9}$$

This expression is the non-linear function of V by which the probe is contoured according to the invention to obtain a fuel mass measurement. Note that f(V) of equation (9) above depends on k, thus a nominal value, $k_o$, is chosen to define f(V). Substituting equation (9) into equation (8) obtains the following expression of the effect of variations in k:

$$\text{error} = V \left[ \frac{a + b(k-1)}{a + b(k-1)\left[\frac{(k_o-1)(1-V)}{k-1} + V\right]} - 1 \right]. \tag{10}$$

Figure 2:
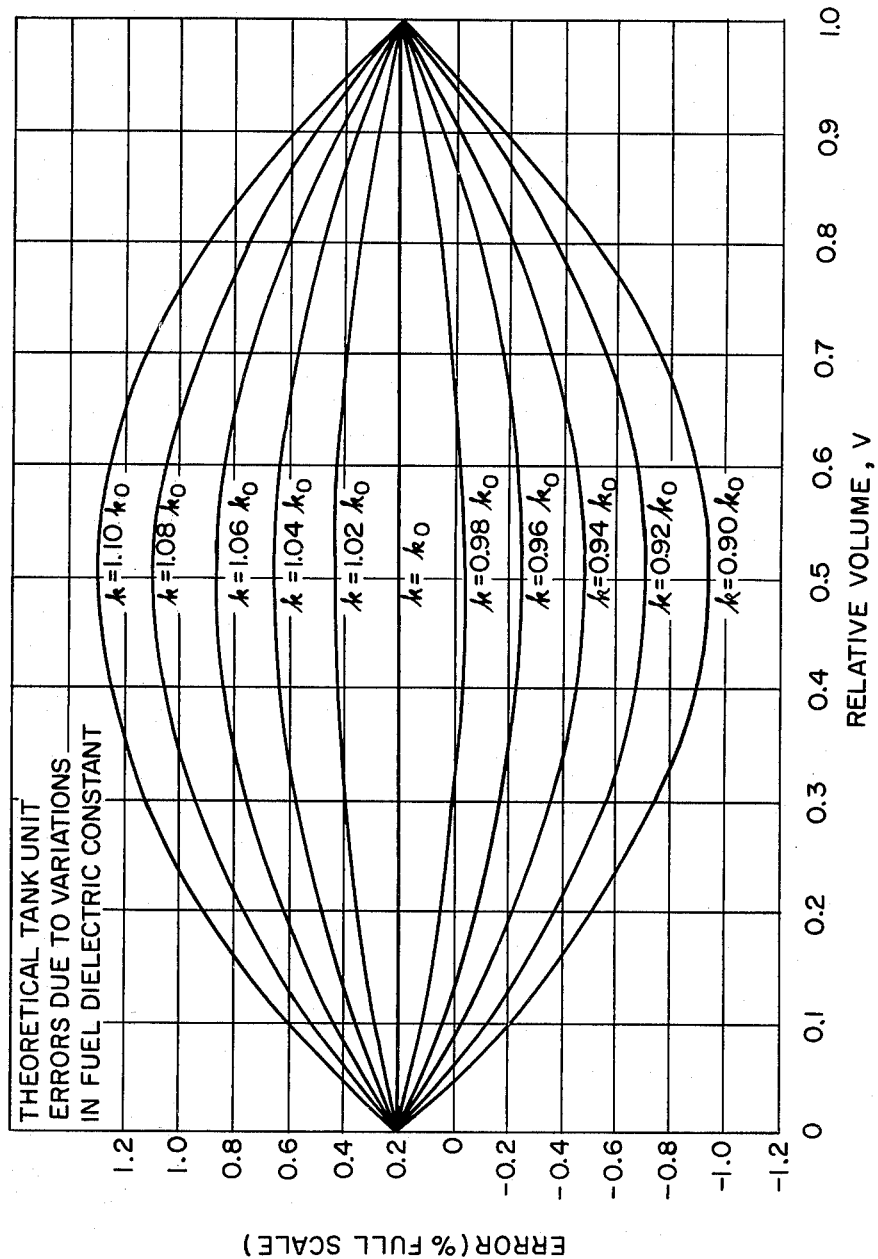
FIG. 2 is a chart showing theoretical tank unit errors due to variations in fuel dielectric constant.

Note that error is 0 for $k = k_o$ or V=0 or V=1. Using equation (10), theoretical errors in the distributed compensated gaging system of the invention can be computed. FIG. 2, reference to which should be made, shows a family of error plots for various values of k, with $k_o$ taken as 2, a=0.127 and b=0.0368. These values were taken from the U.S. Government specification MIL-G-26988C as calibration constants applicable to gaging systems that must operate in a variety of fuels. As will be noted by those skilled in the art, the theoretical full scale errors for fuel gage built according to the present invention are well within established limits and are substantially less than those obtainable according to the prior art in the presence of fuel stratification.

Figure 3:
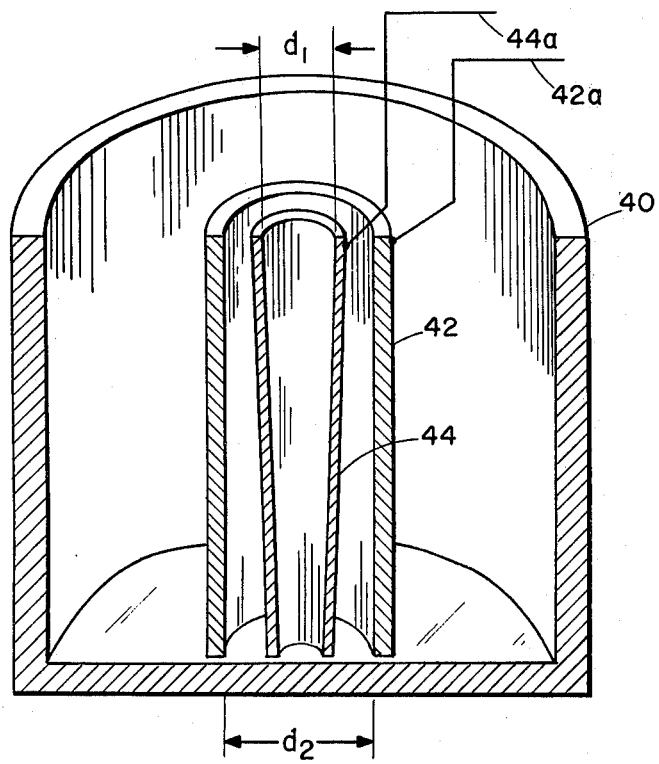
FIG. 3 shows a fuel tank and fluid measuring probe and is used to illustrate the design of the fluid measuring apparatus of the invention.

FIG. 3, reference to which should now be made, is provided as an aid in illustrating how a fluid gage according to the present invention can be designed. A simple cylindrical fuel tank having a cross-sectional area of 5 square feet and a one foot height is assumed. Although not critical, a central gaging probe is assumed which is designed to gage the entire one foot tank height. The figure shows in cross section a container 40 and a probe comprised of an outer cylindrical electrode 42 and an inner electrode 44.

Electrical connection is provided to the electrodes by schematically shown means 42a and 44a respectively. The inner electrode for this particular embodiment is in the form of an inverted frustum as will be shown below. Means for positioning and securing the probe within container 40 are well known in the art and thus, for clarity, not shown. The design process to be followed below is outlined by the following five steps:

1. Determine the waterline data (fuel height as a function of fuel volume) for the tank to be gaged.
2. For each fuel volume compute the value of f(V) as given in equation (9) above.
3. Compute the new function of fuel height vs. f(V).
4. For each fuel height increment determine the diameter of the probe inner electrode required to produce a capacitance change proportional to the corresponding increment in f(V). The capacitance change per unit height is controlled by the distance between the inner and outer electrodes.
5. For the prescribed system constants and the empty probe capacitance resulting from step 4 above, determine the value of the fixed series capacitor.

These steps are carried out one at a time below to illustrate the details of their application.

STEP 1

Determine Waterline Data

For the cylindrical tank of FIG. 3 fuel height h is linearly related to fuel volume $V_f$ by:

$$h = V_f/A$$

where A is the cross-sectional area of the cylinder. Values of h and $V_f$ are tabulated in the first two columns of the calculation table of FIG. 4 for an assumed tank having A equal to 5 square feet.

STEP 2

Compute Values of f(V)

Equation (9) above with k set equal to the above-mentioned nominal value $k_o$ is used. Making the substitution equation (9) becomes:

$$f(V) = \frac{aV}{a + b(k_o - 1)(1 - V)}$$

where
$V = V_f/V_{fmax}$ = normalized fuel volume
$V_{fmax}$ = Total tank volume
and, a, b are constants associated with the fuel type. Assume the fuel to be gaged is a JP4 type jet fuel. Then, from U.S. military specification MIL-G-26988C, para. 3.6.3a, the specified relationship between fuel density D and dielectric constant k is found to be:

$$D = \frac{k - 1}{0.122 + 0.0411(k - 1)}.$$

Also from para. 4.3.6 of the above-mentioned specification the nominal dielectric constant is 2.090. Thus, the values of the fuel-related parameters are:
a = 0.122
b = 0.0411
k = 2.090

Figure 5:
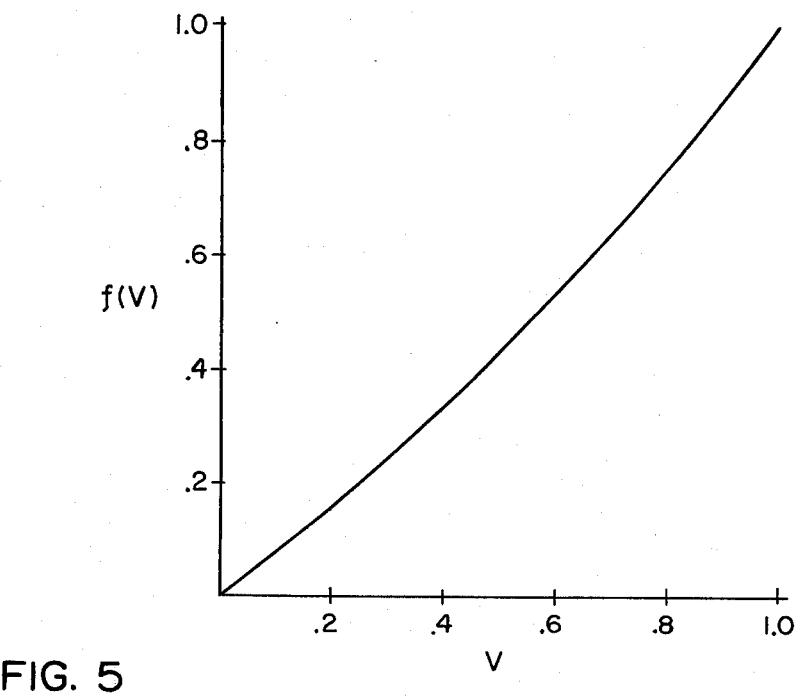
FIG. 5 is a plot of f(V) vs. V.

These values are now used to calculate f(V) values. Results of the computations are tabulated in the third and fourth columns of FIG. 4. A plot of f(V) vs. V is shown in FIG. 5.

STEP 3

Compute Fuel Height vs. f(V)

By calculating f(V) in Step 2 above at the tabulated values of h (column 2 of FIG. 4), this task is already accomplished. The function h vs. f(V) is tabulated in columns 2 and 4 of FIG. 4.

STEP 4

Determine the Contour of the Inner Electrode

The inner electrode is designed to produce the desired relationship between probe capacitance $C_p$ and f(V). This relationship is given by equation (2), repeated here for convenience:

$$C_p = C_{po}[1 + f(V)(k - 1)] \quad (2)$$

where $C_{po}$, a constant, is the "active capacitance" (the capacitance when no fuel is present) of the probe. The change in $C_p$ per unit increment in f(V) is to be constant, i.e., there is to be a linear relationship between $C_p$ and f(V). This is expressed as $$\frac{\partial C_p}{\partial f(V)} = C_{po}(k - 1) = \text{constant}.$$

The change in capacitance per height increment of fuel between the two coaxial tubes that make up the probe is given by $$(\partial C_p/\partial h) = N(g)\epsilon(k-1)$$

where:
$\epsilon = 8.854$ pF/$_m$ (permittivity of free space)
N(g) = a dimensionless number which is a function of the geometry, g, of the probe. Typically, N(g) will vary continuously along the height of the probe in accordance with geometry variations along the height of the probe.
h = height of fuel on probe.
Combine the two differential equations as follows. First expand $\partial C_p/\partial f(V)$ as $$\frac{\partial C_p}{\partial f(V)} = \frac{\partial C_p}{\partial h} \cdot \frac{dh}{df(V)} = C_{po}(k - 1)$$

then substitute the expression for $\partial C_p/\partial h$ to obtain $$N(g)\epsilon \frac{dh}{df(V)} = C_{po}.$$

Rearrange this to obtain the following formula which relates probe geometry, N(g), to tank geometry, f(V):

$$N(g) = \frac{C_{po}}{\epsilon} \cdot \frac{df(V)}{dh}. \quad (11)$$

This is the basic formula used to design the probe. To illustrate, consider the conventional type of fuel probe consisting of the two coaxial cylinders. For this geometry N(g) has the following form, as can be determined from handbook formulas:

$$N(g) = \frac{2\pi}{\ln(d_2/d_1)}, \quad (11A)$$

where
  $d_2$ = inner diameter of outer tube
  $d_1$ = outer diameter of inner tube.
Typically, $d_2$ is constant over the height of the probe, and the design problem is to determine $d_1$ at every height to achieve the desired capacitance-height relation. To do this, substitute (11) into (11A) to obtain $$\frac{2\pi}{\ln(d_2/d_1)} = \frac{C_{po}}{\epsilon} \frac{df(V)}{dh}$$

and solve for $d_1$:

$$d_1 = \exp\left[\ln d_2 - \frac{2\pi\epsilon}{C_{po}} \times \frac{dh}{df(V)}\right]. \quad (12)$$

In order to compute the diameter values for the inner tube, values for the outer tube diameter and the active capacitance of the probe must now be selected.

Let $d_2 = 1$ inch (a standard value for tube diameter) and let $C_{po} = 30$ pf (an arbitrary but reasonable value).
In the computation, substitute $\Delta h/\Delta f(V)$ for $dh/df(V)$ since a tabulated function rather than an analytical one is involved. Also, convert $\epsilon$ from units of pF/m to pF/ft.
Incorporating the above information into equation (11) produces:

$$d_1 = \exp -\left[\frac{16.596\ pF/ft}{30\ pF} \times \frac{\Delta h}{\Delta f(V)}\right]$$

where $d_1$ is in inches and h is in feet. Proceed now to calculate values of $d_1$ at each value of h. Results of the calculations are shown in columns 5, 6 and 7 of FIG. 4. Also, a plot of tube radius ($d_1/2$) vs. h, which specifies the shape of the inner electrode, is shown in FIG. 6.

Figure 6:
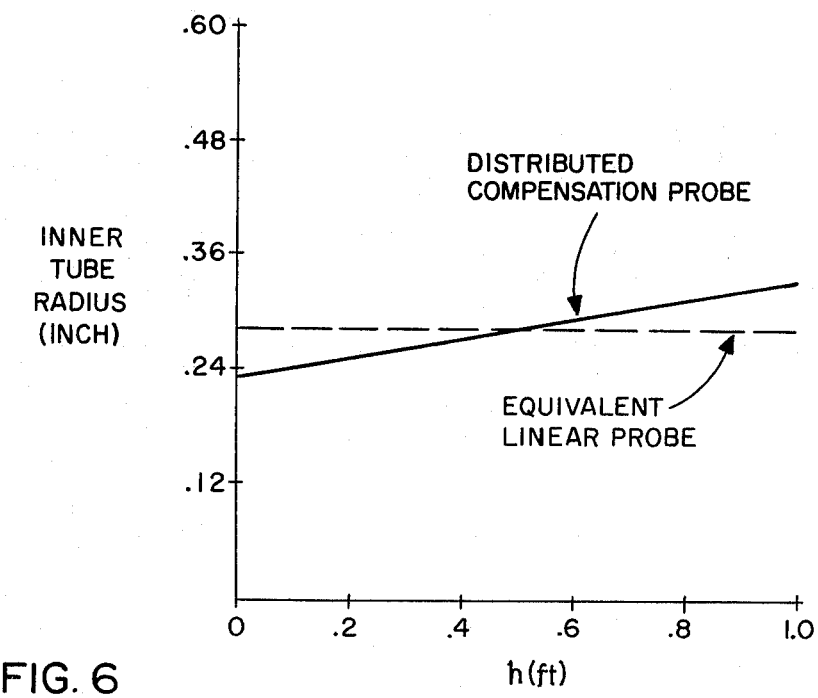
FIG. 6 is a plot of the inner electrode diameter vs. length for the illustrative probe design of the specification.

For comparison, the inner electrode radius of a conventional probe design is also shown on the plot of FIG. 6. This radius was computed from $$d_1 = \exp -\left[\frac{16.596\ pF/ft}{30\ pF} \frac{\Delta h}{\Delta V}\right] = 575\ \text{inch.}$$

Note that in this case we have $\Delta h/\Delta V$ in place of $\Delta h/\Delta f(V)$ because linear capacitance-volume relationship is desired. Since a "linear" tank is being gaged (constant cross-sectional area) $\Delta h/\Delta V$ is constant. Therefore, the inner electrode diameter is constant and a linear conventional probe design for our tank is obtained.

STEP 5

Select Value of Fixed Capacitor

The final step in the design process is to determine the value of the fixed capacitor $C_f$ that goes in series with the probe. To do this consider equation (5) which is repeated here for convenience:

$$\Delta C_e = \frac{C_f^2\ C_{po} f(V)\ (k-1)}{(C_f + C_{po})^2 + (C_f C_{po} + C_{po}^2)\ f(V)\ (k-1)}. \quad (5)$$

Factor equation (5) as follows:

$$\Delta C_e = \frac{C_f^2\ C_{po}}{C_f + C_{po}} \times \frac{f(V)\ (k-1)}{(C_f + C_{po}) + C_{po} f(V)\ (k-1)}.$$

In order for $\Delta C_e$ to be linear with fuel mass, the following ratio must be maintained:

$$(C_{po}/C_f + C_{po}) = b/a = 0.3369.$$

By substituting $C_{po} = 30$ pF and solving $C_f$, we find $C_f = 59.1$ pF. This completes step 5.

DESIGN SUMMARY

Figure 7:
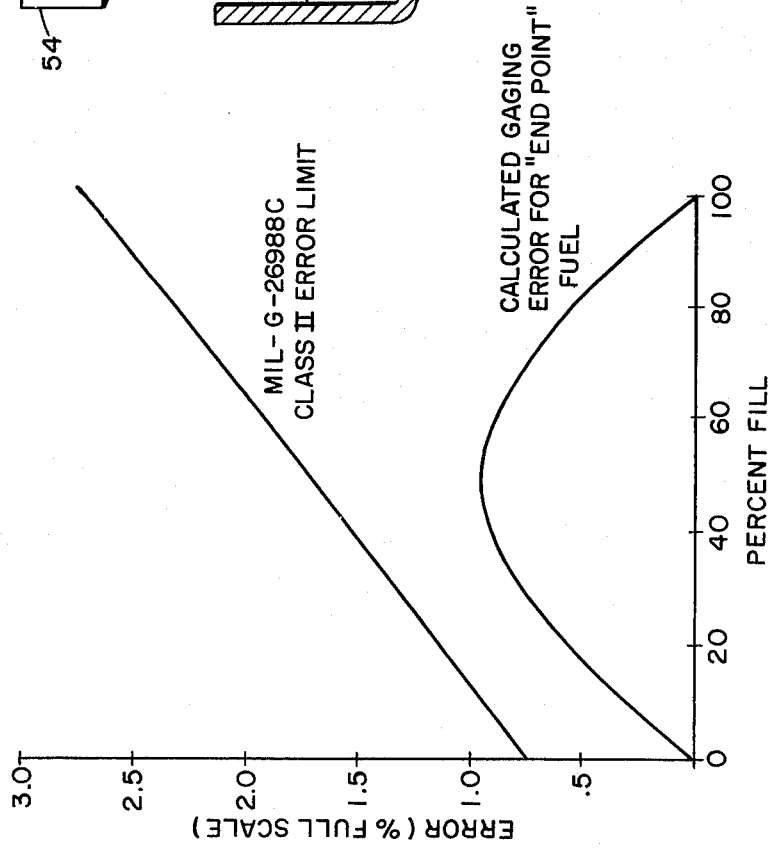
FIG. 7 is an error plot for the illustrative probe design of the specification.

The completed design for a fuel probe with distributed compensation that resulted from the 5-step process consists of:

1. A fixed capacitor with the value 59.1 pF.
2. A probe comprising a cylindrical outer electrode with an inside diameter of 1 inch and an inner electrode whose outer diameter varies with its length as shown in column 7 of FIG. 4 and in FIGS. 3 and 6. As can be seen in FIG. 7, the inner electrode is an inverted frustum for a cylindrical outer electrode. Both inner and outer electrodes are one foot long, corresponding to the depth of the tank to be gaged. The active capacitance of the probe is 30 pF.
3. A series connection of the fixed capacitor (or the equivalent as will be explained below) and the probe to form a complete assembly.

DESIGN VERIFICATION

To verify the correctness of the design, compute the change in capacitance of the assembly ($C_f$ in series with $C_p$) as quantities of JP 4 fuel are added to the tank. Nominal fuel having nominal density and dielectric (design values) and end point fuel with a density/dielectric combination specified by para. 4.3.6 of MIL-G-26988C as "end-point" (maximum deviation from nominal) values is assumed. This will indicate the ability of the distributed compensation technique of the present invention to accurately gage fuel mass in spite of wide density variation.

The capacitance change of the fuel probe assembly, $\Delta C_e$, is given by equation (5) above. This quantity, along with the pounds of JP 4 fuel and the ratio of $\Delta Ce$ to pounds of fuel is tabulated in FIG. 4 for nominal and end-point values of fuel dielectric/density (columns 8, 9, 10 and columns 11, 12 and 13 respectively). These values are:

| Nominal | End-Point |
| --- | --- |
| k = 2.090 | k = 2.245 |
| D = 6.539 lb/gal | D = 7.191 lb/gal |

Observe from the tabulated values that the ratio of $\Delta C_e$ to pounds of fuel is constant for the nominal fuel, indicating an exactly linear relationship as required. For the end-point fuel, however, the ratio varies, indicating the existence of a non-linearity error. The magnitude of this error in picofarads and percent of full scale is shown in the last two columns of FIG. 4. Notice that this error is less than 1% despite a density variation of 9.97% from nominal. A plot of the calculated errors shown in FIG. 7, and the error limit specified by MIL-G-26988C for class II gages is also shown for comparison. The calculated error for the probe designed herein and having distributed compensation is well within the error limit.

Figure 8:
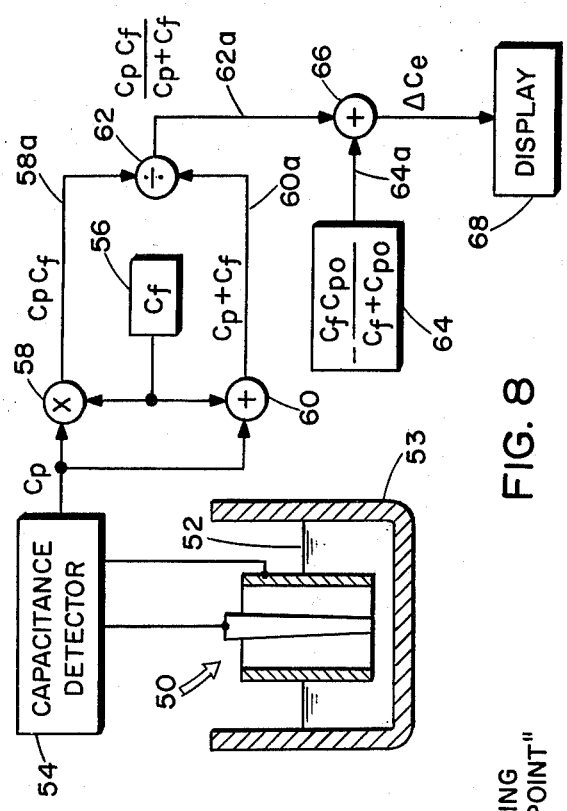
FIG. 8 is a more general schematic of the invention.

It should be understood that although the fixed quantity $C_f$ is introduced by a capacitor in the embodiment of FIG. 1, $C_f$ need not be provided by an actual capacitor but can be provided by any suitable means for generating a constant quantity. For example, means for generating a constant current, voltage or digital number, etc. can be used as should now be obvious to one skilled in the art. This principle is illustrated in FIG. 8, reference to which should now be made. According to that figure the capacitance $C_p$ of a probe 50 varies with the fuel level 52 in a container 53 as was also true in the device of FIG. 1. A capacitance detector 54 of any of the variety known to those skilled in the art produces an output signal quantity (current, voltage, digital number, etc.) related to $C_p$. A constant generator 56 of the type mentioned above generates a compatible constant quantity $C_f$ which is applied to multiplier 58 and adder 60 to which are also applied the signal from capacitance detector 54. Signals relating to $C_p C_f$ and $C_p + C_f$ are thus generated respectively on lines 58a and 60a and divided in divider 62 to generate a signal on line 62a relating to:

$$C_p C_f/(C_p+C_F).$$

Another compatible constant generator 64 generates a signal on line 64a relating to $$C_f C_{po}/(C_f+C_{po})$$

where, as previously defined, $C_{po}$ is the dry capacitance of probe 50. The signals on lines 62a and 64a are combined in adder 66 to produce a signal relating to:

$$\frac{C_p C_f}{C_p + C_f} - \frac{C_f C_{po}}{C_f + C_{po}}. \quad (13)$$

It can be seen by substituting an expression obtained from equation (2) for $C_p$ in equation (4) that equation (13) is equal to $\Delta C_e$ which is the signal seen issuing in FIG. 8 from adder 66 and applied to a suitable display 68 to provide an indication of fuel mass where probe 50 has been contoured as taught above.

Figure 9:
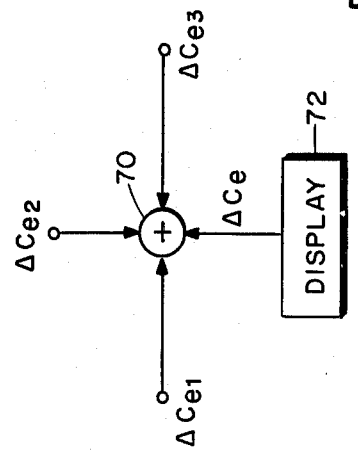

Referring now to FIG. 9 there is seen an adder 70 to which are applied signals relating to $\Delta C_{e1}$, $\Delta C_{e2}$ and $\Delta C_{e3}$ received from three separate fluid measuring devices respectively and more particularly from the adder, such as adder 66, thereof and which gage the fuel in three containers. The signals are added to generate a sum signal relating to $\Delta C_e$ where $\Delta C_e$ is related to the total fuel in the three containers. The latter signal is applied to a suitable linear display device 72 which is similar to the display 68 of FIG. 8. More generally, any number of signals can be combined by means such as shown in FIG. 9 to provide a total fuel mass indication.

Having described the principle of my invention and applied those principles to illustrate the design and structure of the means of the invention, various modifications and alterations thereof should now be apparent to one skilled in the art. For example, using the teachings herein one might design a probe wherein the inner probe is cylindrical and the outer probe specially contoured or both probes may be specially contoured. Also, one might approximate a smoothly contoured probe such as the illustrative probe described herein with a stepped probe. Accordingly, my invention is to be limited by the true spirit and scope of the appended claims.

The invention claimed is:

1. Capacitance fluid measuring means for measuring the mass of a dielectric fluid in a container wherein the mass of fluid in the container is related to the dielectric k, of said fluid and to the level of the fluid in the container through a mathematical expression of the form of said container, f(V), and wherein $$f(V) = \frac{aV}{a + b(k_o - 1)(1 - V)}$$

where a and b are constants relating to the fluid, $k_o$ is the relative nominal dielectric constant of the fluid and V is the normalized volume of fluid in the container at a given fluid level, said fluid measuring means including a capacitor probe having electrodes contoured in accordance with f(V).

2. The capacitance fluid measuring means of claim 1 with additionally a fixed capacitor, connected in series with said capacitor probe.

3. The capacitance fluid measuring means of claims 1 or 2 where a is about 0.127 and b is about 0.0368 when V is expressed in gallons.

4. The capacitance fluid measuring means of claims 1 or 2 where fluid density D is related to fluid dielectric k by an expression of the following form $$D = \frac{k-1}{a+b(k-1)}.$$

5. The capacitance fluid measuring means of claim 2 wherein said fixed capacitor has a capacitance of $C_f$ farads and said capacitor probe has a capacitance of $C_{po}$ farads when said container is empty of fluid to be measured and wherein a and b are related to $C_f$ and $C_{po}$ as follows:

$$(b/a)=C_{po}/(C_f+C_{po}).$$

6. The method of designing a capacitance-type fluid measuring apparatus comprising a capacitor probe and having distributed compensation for use in a fluid container tank comprising:

determining the quantity of fluid, $V_f$, in the tank for a plurality of fluid levels;

determining the value $$f(V) = \frac{aV}{a + b(k_o - 1)(1 - V)}$$

for each $V_f$ where
V = $V_f/V_{fmax}$
$V_{fmax}$ = total tank capacity
a and b are constants associated with the fluid to be measured, and
$k_o$ = relative dielectric constant of the fluid determining the height of fluid in the tank for each value of f(V); and, determining the shape of the capacitor probe by dimensioning the probe along the height of the fluid in accordance with:

$$N(g) = \frac{C_{po}}{\epsilon} \frac{df(V)}{dh}$$

where $C_{po}$ is the capacitance of the measuring apparatus in the tank when the tank is effectively empty, h is the height of fluid in the tank and $\epsilon$ is the permittivity of free space.

7. The method of claim 6 with an additional step of: determining the value, $C_f$, of a fixed capacitor to be arranged serially with the capacitor probe to maintain a linear relationship between $C_p$ and equivalent fluid level where $C_p$ is the capacitance of the measuring apparatus along the height of the fluid to be measured for each value of f(V).

8. The method of claims 6 and 7 wherein a is about 0.127 and b is about 0.0368 when V is expressed in gallons.

9. The method of claims 6 or 7 wherein fluid density D is related to fluid dielectric k by an expression of the following form:

$$D = \frac{k-1}{a + b(k-1)}.$$

10. The method of claim 7 wherein:

$$\frac{b}{a} = \frac{C_{po}}{C_f + C_{po}}.$$

* * * * *